(12) United States Patent
Ingrisch et al.

(10) Patent No.: US 7,923,489 B2
(45) Date of Patent: *Apr. 12, 2011

(54) AMPHIPHILIC POLYMER COMPOUNDS, METHOD FOR THE PRODUCTION THEREOF AND THEIR USE

(75) Inventors: Stefan Ingrisch, Truchtlaching (DE); Gerhard Albrecht, Tacherting (DE); Stefen Thaler, Trostberg (DE); Mathias Bauer, Trostberg (DE)

(73) Assignee: Construction Research & Technology GmbH, Trostberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 11/988,966

(22) PCT Filed: Jul. 20, 2006

(86) PCT No.: PCT/EP2006/007169
§ 371 (c)(1),
(2), (4) Date: Feb. 7, 2008

(87) PCT Pub. No.: WO2007/009797
PCT Pub. Date: Jan. 25, 2007

(65) Prior Publication Data
US 2008/0269376 A1    Oct. 30, 2008

(51) Int. Cl.
C08G 18/34   (2006.01)
C08G 18/36   (2006.01)
C08G 18/48   (2006.01)
C08G 18/66   (2006.01)
C04B 7/42    (2006.01)
C04B 24/28   (2006.01)

(52) U.S. Cl. ............ 524/4; 525/453; 525/454; 525/460; 525/528; 525/533; 528/59; 528/65; 106/808; 106/810; 524/5

(58) Field of Classification Search .................... 525/453
See application file for complete search history.

(56) References Cited

U.S. PATENT DOCUMENTS

| | | | | |
|---|---|---|---|---|
| 3,562,081 | A * | 2/1971 | Stalego | 442/332 |
| 4,249,949 | A * | 2/1981 | Wooler et al. | 588/8 |
| 4,472,550 | A * | 9/1984 | Reiff et al. | 524/589 |
| 4,978,392 | A * | 12/1990 | Kilbarger et al. | 106/661 |
| 5,460,648 | A | 10/1995 | Walloch et al. | |
| 5,594,594 | A | 1/1997 | Dong et al. | |
| 6,231,665 | B1 * | 5/2001 | Kerkar et al. | 106/810 |
| 6,302,955 | B1 * | 10/2001 | Kerkar et al. | 106/802 |
| 6,462,127 | B1 | 10/2002 | Ingrisch et al. | |
| 6,598,634 | B1 * | 7/2003 | Koch et al. | 152/197 |
| 6,761,765 | B2 * | 7/2004 | Lu | 106/823 |
| 2002/0005149 | A1 | 1/2002 | Karkare et al. | |
| 2003/0024441 | A1 | 2/2003 | Shimoyama et al. | |
| 2004/0014847 | A1 * | 1/2004 | Bolte et al. | 524/59 |
| 2005/0070674 | A1 * | 3/2005 | Rodrigues et al. | 525/523 |
| 2005/0098062 | A1 | 5/2005 | Butler et al. | |

FOREIGN PATENT DOCUMENTS

| | | |
|---|---|---|
| DE | 32 29 564 A1 | 2/1984 |
| DE | 43 41 260 A1 | 5/1994 |
| DE | 195 39 908 A1 | 5/1996 |
| DE | 198 58 554 A1 | 6/2000 |
| DE | 200 02 539 U1 | 3/2001 |
| EP | 0 092 242 A1 | 10/1983 |
| EP | 0 245 857 B1 | 11/1987 |
| EP | 0 357 886 A1 | 3/1990 |
| EP | 0 359 068 A2 | 3/1990 |
| EP | 1 160 219 A1 | 12/2001 |
| EP | 1 547 987 A2 | 6/2005 |
| JP | 05319882 A | 12/1993 |
| WO | WO 00/23393 | 4/2000 |

* cited by examiner

*Primary Examiner* — David Buttner
*Assistant Examiner* — Mike Dollinger
(74) *Attorney, Agent, or Firm* — Fulbright & Jaworski L.L.P.

(57) ABSTRACT

The invention describes amphiphilic polymer compounds which are prepared by
a) reacting a di-, tri- or tetraglycidyl compound (A) with an optionally unsaturated reactive component (B) consisting of $C_8$-$C_{28}$-fatty acid, a $C_8$-$C_{28}$-alcohol or a secondary $C_8$-$C_{28}$-amine, and allowing
$b_1$) the reaction product from stage a) to react further first with
$b_{1\alpha}$) an aliphatic or aromatic polyisocyanate compound (C)
$b_{1\beta}$) and optionally then with a polyalkylene oxide compound (D), and
$b_{1\gamma}$) reacting the reaction product from stage $b_{1\alpha}$) or optionally $b_{1\beta}$) with a component (E) which is reactive towards isocyanates and has at least one OH, $NH_2$, NH or SH group, or
$b_2$) allowing the reaction product from stage a) to react to completion with the reaction product of component (C) with component (E) and optionally (D) and (C), or
$b_3$) allowing the reaction product from stage a) to react to completion with the reaction product from component (C) and component (D) and optionally (C) and optionally the reaction product of component (C) and component (E) and optionally (C).

The polymer compounds proposed according to the invention are exceptionally useful as agents for preventing or suppressing efflorescences on surfaces of hardened, hydraulically settable building materials or/and for hydrophobization of the corresponding hydraulically settable systems. Moreover, owing to the admixtures proposed according to the invention, the corresponding products absorb substantially less water, with the result that frost damage and rapid rusting of the steel reinforcement can be substantially reduced.

22 Claims, No Drawings

AMPHIPHILIC POLYMER COMPOUNDS, METHOD FOR THE PRODUCTION THEREOF AND THEIR USE

This application is a §371 of PCT/EP2006/007169 filed Jul. 20, 2006, which claims priority from German Patent Application No: 10 2005 034 183.7 filed Jul. 21, 2005.

The present invention relates to amphiphilic polymer compounds, a method for the production thereof and their use as an admixture for hydraulically settable building materials (such as, for example, concrete or mortar) which is used in particular for mass hydrophobization or/and for suppression of efflorescence on surfaces of hardened, hydraulically settable building materials.

A known problem, particularly in the case of cement-based building materials, is the occurrence of so-called efflorescence, a distinction being made between primary and secondary efflorescence. The first-mentioned arises as early as during hardening, for example in the case of concrete, the capillaries of the fresh concrete being filled with an aqueous solution of the water-soluble substances of the cement, substantially calcium hydroxide. On hardening, the calcium hydroxide on the concrete surface reacts with the carbon dioxide of the air with formation of sparingly soluble calcium carbonate. As a result of the precipitation of calcium carbonate, the calcium hydroxide concentration at the capillary mouth is lower than in the interior of the capillaries. Fresh calcium hydroxide therefore continuously diffuses from the deeper layers of the concrete to the capillary mouth and in turn reacts with $CO_2$ to give calcium carbonate. The corresponding process stops only when the capillary mouths are closed by calcium carbonate. Such primary efflorescence occurs in a particularly pronounced manner when a condensation film forms on the concrete surface, because the calcium hydroxide can then become distributed over the entire concrete surface and coat this with water-insoluble calcium carbonate after the reaction with carbon dioxide.

In addition, the outdoor weathering of completely hardened concrete can result in spot formation, which is generally referred to as secondary efflorescence. This secondary efflorescence lasts as a rule from 1 to 2 years, the slow formation of water-soluble calcium bicarbonate from calcium carbonate being regarded as a cause.

Since the appearance of such structural elements associated with efflorescence is very greatly impaired, particularly in the case of colored concrete products, there has been no lack of attempts to prevent or to suppress this efflorescence by various measures.

According to the prior art, two basic possibilities were proposed for this purpose, none of which, however, have led to satisfactory results. Firstly the surfaces of hardened cement or concrete products are provided with special coatings, especially various silicate and acrylate coatings having been recommended. However, the fact that these subsequent coatings are relatively inconvenient and uneconomical is disadvantageous in this method.

For this reason, attempts have been made to add suitable additives to the building materials prior to the curing thereof, which additives are intended to prevent or suppress the formation of efflorescence.

Thus, DE 32 29 564 A1 discloses the use of additional chalk, for example in the form of an aqueous chalk slurry, in the production of colored pre-cast concrete blocks. This is intended to shift the gradient of formation of calcium carbonate to the surface by offering excess calcium carbonate right at the beginning of the solidification process.

Finally, according to EP 92 242 A1, it is proposed to add surface-active polymers to the concrete for preventing efflorescence. These surface-active polymers should lose their surface activity irreversibly during the hardening of the concrete and should thus be converted into water-insoluble products.

In practice, such water repellents for unhardened building materials have not become established since they do not have a reliable effect under the various weathering conditions.

It was therefore the object of the present invention to provide agents for the prevention of efflorescence on surfaces of hardened, hydraulically settable building materials or/and for mass hydrophobization, which agents do not have the said disadvantages of the prior art but effectively and reliably prevent the efflorescence of hydraulically settable building materials.

This object was achieved, according to the invention, by the provision of amphiphilic polymer compounds which have been prepared by a) reacting a di-, tri- or tetraglycidyl compound (A) with an optionally unsaturated reactive component (B) consisting of $C_8$-$C_{28}$-fatty acid, a $C_8$-$C_{28}$-alcohol or a secondary $C_8$-$C_{28}$-amine, and allowing $b_1$) the reaction product from stage a) to react further first with $b_{1\alpha}$) an aliphatic or aromatic polyisocyanate compound (C)

$b_{1\beta}$) and optionally then with a polyalkylene oxide compound (D) of the general formula (I)

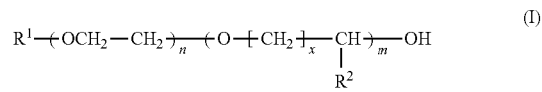

in which $R^1$ is H, a linear or branched and optionally unsaturated aliphatic hydrocarbon radical having 1 to 12 C atoms, $R^2$ is a linear or branched and optionally unsaturated aliphatic hydrocarbon radical having 1 to 30 C atoms or phenyl, m is from 0 to 250, n is from 3 to 250 and x is from 1 to 12, and the ethylene oxide or higher alkylene oxide units can be arbitrarily distributed in the polyalkylene oxide compound (D), and $b_{1\gamma}$) reacting the reaction product from stage $b_{1\alpha}$) or optionally $b_{1\beta}$) with a component (E) which is reactive towards isocyanates and has at least one OH, $NH_2$, NH or SH group, or $b_2$) allowing the reaction product from stage a) to react to completion with the reaction product of component (C) with component (E) and optionally (D) and (C), or $b_3$) allowing the reaction product from stage a) to react to completion with the reaction product from component (C) and component (D) and optionally (C) and optionally the reaction product of component (C) and component (E) and optionally (C).

It has surprisingly been found here that these polymer compounds are excellently suitable as agents for preventing efflorescence or/and for hydrophobization of hydraulically settable building materials. Moreover, owing to the admixtures according to the invention, the hydraulically settable products absorb substantially less water, with the result that frost damage and rapid rusting of the steel reinforcement can be substantially reduced.

The amphiphilic polymer compounds according to the invention are obtainable by an at least two-stage method comprising the reaction steps a) and b).

In the first reaction stage a), a di-, tri- or tetraglycidyl compound (A) is reacted with a reactive component (B).

Glycidyl compounds (A) which are selected from the group consisting of cyclohexanedimethanol diglycidyl ether, glyceryl triglycidyl ether, neopentylglycol diglycidyl ether, pentaerythrityl tetraglycidyl ether, 1,6-hexanediol diglycidyl ether, polypropylene glycol diglycidyl ether, polyethylene glycol diglycidyl ether, trimethylolpropane triglycidyl ether, bisphenol A diglycidyl ether, bisphenol F diglycidyl ether, 4,4'-methylenebis(N,N-diglycidylaniline), tetraphenyl-olethane glycidyl ether, N,N-diglycidylaniline, diethylene glycol diglycidyl ether and 1,4-butanediol diglycidyl ether, or mixtures thereof are particularly advantageously used.

It is also to be regarded as being essential to the invention that the reactive component (B) consists of a $C_8$-$C_{28}$-fatty acid, $C_8$-$C_{28}$-alcohol or a secondary $C_8$-$C_{28}$-amine, it being possible for the reactive component to have saturated or unsaturated radicals.

From the group consisting of the fatty acids, tall oil fatty acid, stearic acid, palmitic acid, sunflower oil fatty acid, coconut oil fatty acid ($C_8$-$C_{18}$), coconut oil fatty acid ($C_{12}$-$C_{18}$), soybean oil fatty acid, linseed oil fatty acid, dodecanoic acid, oleic acid, linqleic acid, palm kernel oil fatty acid, palm oil fatty acid, linolenic acid or/and arachidonic acid are to be regarded as being preferred. In the case of the $C_8$-$C_{28}$-alcohols, 1-eicosanol, 1-octadecanol, 1-hexadecanol, 1-tetradecanol, 1-dodecanol, 1-decanol and 1-octanol have proven particularly useful. In the case of the secondary amines having 8 to 28 C atoms in particular the alkylamines from the group consisting of 2-ethylhexylamine, dipentylamine, dihexylamine, dioctylamine, bis(2-ethylhexyl)amine, N-methyloctadecylamine and didecylamine are used.

The molar ratio of glycidyl components (A) to the reactive component (B) can be varied within wide limits, but it has proven particularly advantageous to use from 0.9 to 1.1 mol of the reactive component (B) per mole of the glycidyl groups of component (A).

The second reaction stage b) can be effected in various ways. According to the first variant $b_1$) of the method, the reaction product from stage a) is reacted in the stage $b_{1\alpha}$) first with an aliphatic or aromatic polyisocyanate compound (C).

Preferably used aliphatic polyisocyanate compounds are 1-isocyanato-5-isocyanatomethyl-3,3,5-trimethylcyclohexane (IPDI), bis(4-isocyanatocyclohexyl)methane (H12MDI), 1,3-bis(1-isocyanato-1-methylethyl)benzene (m-TMXDI), 1,6-diisocyanatohexane (HDI), optionally the higher homologs thereof or industrial isomer mixtures of the individual aliphatic polyisocyanates, while preferably used aromatic polyisocyanates are in particular 2,4-diisocyanatotoluene (TDI), bis(4-isocyanatophenyl)methane (MDI) and optionally the higher homologs thereof (polymeric MDI) or industrial isomer mixtures of the individual aromatic polyisocyanates.

According to a preferred embodiment, the polyisocyanate compound is used in an amount such that the NCO/OH equivalent ratio, based on the free OH group in the reaction product of glycidyl component (A) and the reactive component (B) from stage a), is from 0.5 to 2.0.

In the state $b_{1\beta}$), the reaction product from stage $b_{1\alpha}$) can optionally then be reacted with a compound (D) of the general formula (I).

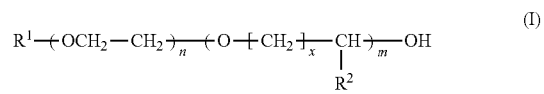

Here,
$R^1$ is H, a linear or branched and optionally unsaturated aliphatic hydrocarbon radical having 1 to 12 C atoms,
$R^2$ is a linear or branched and optionally unsaturated aliphatic hydrocarbon radical having 1 to 30 C atoms or phenyl,
m is from 0 to 250,
n is from 3 to 250 and
x is from 1 to 12,
and the ethylene oxide or higher alkylene oxide units can be arbitrarily distributed in the polyalkylene oxide compound (D).
R in formula (I) is preferably —$CH_3$(methyl), CH=$CH_2$— (vinyl) and $CH_2$=CH—$CH_2$-(allyl) Methoxypolyethylene glycol (MPEG) is particularly preferably used as polyalkylene oxide compound (D).

It has proven particularly advantageous if the polyalkylene oxide compound (D) is used in an amount of from 0.4 to 0.6 mol per mole of free isocyanate groups of the reaction product in stage $b_{1\alpha}$).

The reaction product from stage $b_{1\beta}$) or $b_{1\alpha}$) is then allowed to react in stage $b_{1\gamma}$) with a component (E) reactive toward isocyanates and having at least one OH, $NH_2$, NH or SH group.

In particular, aliphatic alcohols, primary or secondary amines and thiols, having in each case 1 to 12 C atoms or aromatic alcohols, (primary or secondary) amines and thiols, each having 6 to 10 C atoms are used as component (E). Linear or branched $C_2$-$C_4$-alcohols or thiols, primary or secondary amines having $C_1$-$C_4$-alkyl or phenyl radicals, optionally substituted phenols or thiophenols are preferably used here. According to a preferred embodiment, amino- or mercaptosilanes selected from the group consisting of 3-aminopropyltriethoxysilane, 3-aminopropyltrimethoxysilane, 2-aminoethyl-3-aminopropyltrimethoxysilane, bis(3-triethoxysilylpropyl)amine, bis(3-trimethoxysilylpropyl) amine, N-(n-butyl)-3-aminopropyltrimethoxysilane, N-(2-aminoethyl)-3-aminopropylmethyldimethoxysilane, 3-aminopropylmethyldiethoxysilane, 3-aminopropylmethyldiethoxysilane, 3-mercaptopropyltrimethoxysilane and 3-mercaptopropyltriethoxysilane are used as component (E).

Preferably, the component (E) is used in an amount of from 0.4 to 0.6 mol per mole of free isocyanate groups of the reaction products in stage $b_{1\alpha}$) or $b_{1\beta}$).

According to a further variant $b_2$) of the method, the reaction product from stage a) can also be allowed to react with the reaction product of component (C) with component (E), it being possible optionally to add the components (C) and (D) simultaneously or in succession to the reaction mixture as further reactants.

Finally, it is also possible within the scope of the present invention according to variant $b_3$) of the method, to allow the reaction product from stage a) to react to completion with the reaction product of component (C) and component (D) and optionally (C), it also being possible to add the reaction product of component (C) and component (E) and optionally (C) simultaneously or in succession to the reaction mixture.

The reaction of the glycidyl compound (A) with the reactive component (B) according to stage a) has been sufficiently described according to the prior art. Thus, the reaction of epoxides with carboxylic acids is described in "Reaktionen der organischen Synthese [Reactions of organic synthesis]", Cesare Ferri, 1st edition 1978, page 505, and in "Methoden der organischen Chemie [Methods of organic chemistry]", Houben-Weyl, 4th edition, volume 6/3, page 459, and volume 14/2, pages 507 to 510. Regarding the reaction of epoxides with alcohols, reference may be made to "Methoden der organischen Chemie [Methods of organic chemistry]", Houben-Weyl, 4th edition, volume 6/3, pages 40 to 44 and pages 456 to 458, and volume 14/2, pages 503 to 506, and to "Reaktionen der organischen Synthese [Reactions of organic synthesis]", Cesare Ferri, 1st edition 1978, page 505. The reaction of epoxides with amines is disclosed, for example, in "Methoden der organischen Chemie [Methods of organic chemistry]", Houben-Weyl, 4th edition, volume 14/2, pages 516 to 523, and in "Reaktionen der organischen Synthese [Reactions of organic synthesis]", Cesare Ferri, 1st edition 1978, pages 504 to 505.

The reaction of the glycidyl component (A) with the reactive component (B) is preferably effected at temperatures of from 20 to 250° C., it being possible for the reaction optionally to be effected in the presence of a catalyst. Thus, it has proven particularly advantageous to resort to basic catalysts, for example, tetraalkylammonium halides or alkali metal oxides, in the reaction of the glycidyl component (A) with the fatty acid as reactive component (B). In the case of the reaction of the glycidyl component (A) with an alcohol as reactive component (B), the reaction can be carried out either under acid catalysis (e.g. sulfuric acid, perchloric acid, hydrofluoric acid, boron trifluoride, tin(IV) chloride) or under base catalysis (e.g. alkali metal hydroxides, alkali metal alcoholates, tertiary amines).

The reaction of the glycidyl component (A) with the secondary amines as reactive component (B) is effected as a rule without a catalyst, but small amounts of water or alcohol (e.g. phenol) can be added to the reaction mixture.

The reaction of the reaction product from stage a) is effected according to variant b1) of the method, in the following three part-steps:

$b_{1\alpha}$) reaction with the polyisocyanate component (C) without a solvent at temperatures of from 20 to 120° C., $b_{1\beta}$) and optionally subsequent further reaction with the polyalkylene oxide compound (D) without a Solvent at temperatures of from 20 to 150° C., and $b_{1\gamma}$) reaction of the reaction product from stage $b_{1\alpha}$) or optionally $b_{1\beta}$) to completion with the component (E) without a solvent at temperatures of from 20 to 150° C.

In a preferred embodiment, the reactions mentioned in steps $b_{1\beta}$) and $b_{1\gamma}$), are effected in each case without the use of a solvent.

Alternatively, the reaction sequence according to variant $b_1$) may appear as follows:

$b_{1\alpha}$) further reaction of the reaction product from stage a) with the polyisocyanate component (C) at temperatures of from 20 to 120° C. and $b_{1\beta}$) reaction of the reaction product from stage $b_{1\alpha}$) to completion with the polyalkylene oxide compound (D) and the component (E) reactive toward isocyanates, either in succession or simultaneously, at temperatures of from 20 to 150° C.

As a further embodiment according to the present invention, the further reaction of the reaction product from stage a) is effected according to variant $b_2$) of the method in the form such that this reaction product from stage a) is allowed to react to completion with the reaction product of component (C) with component (E) and optionally (D) and (C) at temperatures of from 20 to 150° C. The reaction of component (C) with component (E) is preferably effected here without a solvent at temperatures of from 20 to 150° C.

Finally, it is also possible within the scope of the present invention according to variant $b_3$) of the method, to allow the reaction product from stage a) to react with the reaction product of components (C) and (D) and optionally (C) and optionally with the reaction product of component (C) and (E) and optionally (C).

The polymer compounds according to the invention can be produced both batchwise and continuously or semicontinuously.

The polymer compounds proposed according to the invention are outstandingly suitable for the mass hydrophobization of hydraulically settable building materials or/and for suppressing efflorescence on the surface of hardened, hydraulically settable building materials. Here, the polymer compounds are added to the mixed and unhardened, hydraulically settable building materials in an amount of from 0.001 to 5% by weight, based on the proportion of binder. All concrete and mortar systems which contain cement or cement substitutes, such as, for example, silica dust, blast furnace slack or fly ash, as the main binder and optionally also lime, gypsum or anhydrite as a secondary constituent are to be regarded as hydraulically settable building materials according to the present invention. However, it is also possible for calcium sulfate in the form of, for example, gypsum, anhydrite or hemihydrate to be used as the main binder and cement, silica dust, blast furnace slag or fly ash to be used as the secondary constituent.

However, it is also possible within the scope of the present invention for the admixtures according to the invention to be added to the mixing water or residual water in emulsified form with the aid of external emulsifiers (for example ethoxylated compounds, such as fatty acid ethoxylate, ethoxylated castor oil or ethoxylated fatty amine).

The polymer compounds proposed according to the invention are outstandingly suitable as agents for the prevention or suppression of efflorescence on surfaces of hardened hydraulically settable building materials or/and for the hydrophobization of the corresponding cement-containing systems.

Moreover, as a result of the admixtures proposed according to the invention, the hydraulically settable products absorb substantially less water, with the result that frost damage and rapid rusting of the reinforcement steel can be substantially reduced.

The following examples are intended to illustrate the invention in more detail.

EXAMPLES

Example 1

Initially introduce 629.8 g (2.1717 mol) of tall oil fatty acid (from Hanf & Nelles) into the reaction vessel at room temperature, add 369.2 g (1.0859 mol) of bisphenol A diglycidyl ether (trade name: Polypox E 270/500; from UPPC) and then add 1.0 g (0.0031 mol) of tetrabutylammonium bromide (from Aldrich). The reaction space is flushed with nitrogen and the reaction mixture is heated to 150° C. This temperature is maintained until an acid number of <2 is reached.

Duration of reaction: about 8 h.

Example 1A

Initially introduce 74.9 g (0.3369 mol) of isophorone diisocyanate (IPDI; from Aldrich) into the reaction vessel at room temperature and add 4 drops of T12-DBTL (catalyst; from Aldrich). Heat the initially introduced mixture in reaction vessel to 40° C. and meter in 155.0 g (0.1685 mol) of the fatty acid adduct from example 1 over about 60 min. The reaction temperature is kept at 40-50° C. After complete addition of the fatty acid adduct from example 1, allow the reaction to continue until the theoretical NCO value for this stage (6.15% by weight) is reached.

Once the theoretical NCO value has been reached, 168.5 g (0.1685 mol) of MPEG 1000 (trade name: Polyglycol M 1000; from Clariant) are metered in. The reaction temperature is kept at 50-60° C. After complete addition of the MPEG 1000, allow the reaction to continue until the theoretical NCO value for this stage (1.78% by weight) is reached.

Once the theoretical NCO value has been reached, 37.3 g (0.1685 mol) of 3-aminopropyltriethoxysilane (trade name: Dynasylan AMEO; from Degussa) are metered in and the temperature of the reaction mixture is kept at 50-60° C. Thereafter, stirring is continued until the NCO value has fallen to zero. The reaction product is mixed with 2469.0 g of tap water with thorough stirring until a homogeneous yellowish almost clear solution (solids content 15% by weight) forms. A pH of 4.0-4.5 is then established with acetic acid (98%; from Aldrich).

Example 1B

Initially introduce 80.0 g (0.3600 mol) of isophorone diisocyanate (IPDI; from Aldrich) into the reaction vessel at room temperature and add 4 drops of T12-DBTL (catalyst; from Aldrich). Heat the initially introduced mixture in the reaction vessel to 40° C. and meter in 165.6 g (0.1800 mol) of the fatty acid adduct from example 1 over about 60 min. The reaction temperature is kept at 40-50° C. After complete addition of the fatty acid adduct from example 1, allow the reaction to continue until the theoretical NCO value for this stage (6.16% by weight) is reached.

Once the theoretical NCO value has been reached, 180.0 g (0.1800 mol) of MPEG 1000 (trade name: Polyglycol M 1000; from Clariant) are metered in. The reaction temperature is kept at 50-60° C. After complete addition of the MPEG 1000, allow the reaction to continue until the theoretical NCO value for this stage (1.78% by weight) is reached.

Once the theoretical NCO value has been reached, 23.3 g (0.1800 mol) of dibutylamine (from Aldrich) are metered in and the temperature of the reaction mixture is kept at 50-60° C. Stirring is then continued until the NCO value has fallen to zero.

The reaction product is mixed with 2543.8 g of tap water with thorough stirring until a homogeneous yellowish almost clear solution (solids content 15% by weight) forms.

Example 1C

Initially introduce 160.0 g (0.1739 mol) of the fatty acid adduct from example 1 into the reaction vessel at 50° C. and add 4 drops of T12-DBTL (catalyst; from Aldrich). Keep the initially introduced mixture in the reaction vessel at 50° C. and meter in ⅓ (15.1 g; 0.0870 mol) of the amount of toluene diisocyanate (TDI; from Aldrich) over about 40 min. The reaction temperature is kept at 50-60° C. After addition of the 1st amount of toluene diisocyanate, allow the reaction to continue until the NCO value has fallen to zero.

Once the NCO value has fallen to zero, the remaining ⅔ (30.3 g; 0.1739 mol) of the amount of toluene diisocyanate (TDI) are added in one portion. The reaction temperature is kept at 60-70° C. and the reaction is allowed to continue until the theoretical NCO value for this stage (3.55% by weight) is reached. Thereafter, 174.0 g (0.0870 mol) of MPEG 2000 (trade name: Polyglycol M 2000; from Clariant) are metered in over 60 min, and the temperature is kept at 60-70° C. After complete addition of the MPEG 2000, allow the reaction to continue until the theoretical NCO value for this stage (0.96% by weight) is reached.

Once the theoretical NCO value has been reached, 19.3 g (0.0870 mol) of 3-aminopropyltriethoxysilane (trade name: Dynasylan AMEO; from Degussa) are metered in and the temperature of the reaction mixture is kept at 50-60° C. Stirring is then continued until the NCO value has fallen to zero. The reaction product is mixed with 2259.3 g of tap water with thorough stirring until homogeneous yellowish almost clear solution (solids content 15% by weight) forms. A pH of 4.0-4.5 is then established with acetic acid (98%; from Aldrich).

Example 2

Initially introduce 631.8 g (2.2524 mol) of sunflower oil fatty acid (from Hanf & Nelles) into the reaction vessel at room temperature, and 367.2 g (0.5632 mol) of pentaerythrityl tetraglycidyl ether (trade name: Polypox R16; from UPPC) and then add 1.0 g (0.0031 mol) of tetrabutylammonium bromide (from Aldrich). The reaction space is flushed with nitrogen and the reaction mixture is heated to 150° C. This temperature is maintained until an acid number of <2 is reached.

Duration of reaction: about 10 h.

Example 2A

Initially introduce 80.0 g (0.3600 mol) of isophorone diisocyanate (IPDI; from Aldrich) into the reaction vessel at room temperature and add 4 drops of T12-DBTL (catalyst; from Aldrich). Heat the initially introduced mixture in the reaction vessel to 40° C. and meter in 159.7 g (0.0900 mol) of the fatty acid adduct from example 2 over about 60 min. The reaction temperature is kept at 40-50° C. After complete addition of the fatty acid adduct from example 2, allow the reaction to continue until the theoretical NCO value for this stage (6.30% by weight) is reached.

Once the theoretical NCO value has been reached, 202.5 g (0.2700 mol) of MPEG 750 (trade name: Polyglycol M 750; from Clariant) are metered in. The reaction temperature is kept at 50-60° C. After complete addition of the MPEG 750, allow the reaction to continue until the theoretical NCO value for this stage (0.85% by weight) is reached.

Once the theoretical NCO value has been reached, 16.1 g (0.0900 mol) of 3-aminopropyltrimethoxysilane (trade name: Dynasylan AMMO; from Degussa) are metered in and the temperature of the reaction mixture is kept at 50-60° C. Stirring is then continued until the NCO value has fallen to zero. The reaction product is mixed with 2597.0 g of tap water with thorough stirring until homogeneous brownish opaque dispersion (solids content 15% by weight) forms. A pH of 4.0-4.5 is then established with acetic acid (98%; from Aldrich).

Example 3

Initially introduce 666.0 g (2.2966 mol) of tall oil fatty acid (from Hanf & Nelles) into the reaction vessel at room temperature, and 333.0 g (0.7655 mol) of trimethylolpropane triglycidyl ether (trade name: Polypox R20; from UPPC) and then add 1.0 g (0.0031 mol) of tetrabutylammonium bromide (from Aldrich). The reaction space is flushed with nitrogen and the reaction mixture is heated to 150° C. This temperature is maintained until an acid number of <2 is reached.

Duration of reaction: about 9 h.

Example 3A

Initially introduce 43.4 g (0.1952 mol) of isophorone diisocyanate (IPDI; from Aldrich) into the reaction vessel at room temperature and add 4 drops of T12-DBTL (catalyst; from Aldrich). Heat the initially introduced mixture in the reaction vessel to 40° C. and meter in 85.0 g (0.0651 mol) of the fatty acid adduct from example 3 over about 60 min. The reaction temperature is kept at 40-50° C. After complete addition of the fatty acid adduct from example 3, allow the reaction to continue until the theoretical NCO value for this stage (6.39% by weight) is reached.

Once the theoretical NCO value has been reached, 130.3 g (0.1303 mol) of MPEG 1000 (trade name: Polyglycol M 1000; from Clariant) are metered in. The reaction temperature is kept at 50-60° C. After complete addition of the MPEG 1000, allow the reaction to continue until the theoretical NCO value for this stage (1.06% by weight) is reached.

Once the theoretical NCO value has been reached, 14.4 g (0.0651 mol) of 3-aminopropyltriethoxysilane (trade name: Dynasylan AMEO; from Degussa) are metered in and the temperature of the reaction mixture is kept at 50-60° C. Stirring is then continued until the NCO value has fallen to zero. The reaction product is mixed with 1547.6 g of tap water with thorough stirring until homogeneous orange opaque dispersion (solids content 15% by weight) forms. A pH of 4.0-4.5 is then established with acetic acid (98%; from Aldrich).

Example 4

Initially introduce 643.4 g (2.2938 mol) of linseed oil fatty acid (from Hanf & Nelles) into the reaction vessel at room temperature, and 355.6 g (1.1471 mol) of neopentylglcyol diglycidyl ether (trade name: Polypox R14; from UPPC) and then add 1.0 g (0.0031 mol) of tetrabutylammonium bromide (from Aldrich). The reaction space is flushed with nitrogen and the reaction mixture is heated to 150° C. This temperature is maintained until an acid number of <2 is reached.

Duration of reaction: about 8 h.

Example 4A

Initially introduce 88.8 g (0.4000 mol) of isophorone diisocyanate (IDPI; from Aldrich) into the reaction vessel at room temperature and add 4 drops of T12-DBTL (catalyst; from Aldrich). Heat the initially introduced mixture in the reaction vessel to 50° C. and add 174.2 g (0.2000 mol) of the fatty acid adduct from example 4 over about 60 min. After complete addition of the fatty acid adduct from example 4, allow the reaction to continue at about 50° C. until the theoretical NCO value for this stage (6.39% by weight) is reached. Once the theoretical NCO value has been reached, 200.0 g (0.2000 mol) of MPEG 1000 (trade name: Polyglycol M 1000; from Clariant) are metered in. The reaction temperature is kept at 50-60° C. After complete addition of the MPEG 1000, allow the reaction to continue until the theoretical NCO value for this stage (1.81% by weight) is reached.

Once the theoretical NCO value has been reached, 35.8 g (0.2000 mol) of 3-aminopropyltrimethoxysilane (trade name: Dynasylan AMMO; from Degussa) are metered in and the temperature of the reaction mixture is kept at 50-60° C. Stirring is then continued until the NCO value has fallen to zero. The reaction product is mixed with 2826.5 g of tap water with thorough stirring until a homogeneous yellowish almost clear solution (solids content 15% by weight) forms. A pH of 4.0-4.5 is then established with acetic acid (98%; from Aldrich).

Example 4B

Initially introduce 88.8 g (0.4000 mol) of isophorone diisocyanate (IPDI; from Aldrich) into the reaction vessel at room temperature and add 4 drops of T12-DBTL (catalyst; from Aldrich). Heat the initially introduced mixture in the reaction vessel to 50° C. and meter in 174.2 g (0.2000 mol) of the fatty acid adduct from example 4 over about 60 min. After complete addition of the fatty acid adduct from example 4, allow the reaction to continue at about 50° C. until the theoretical NCO value for this stage (6.39% by weight) is reached.

Once the theoretical NCO value has been reached, 25.9 g (0.2000 mol) of dibutylamine (from Aldrich) are slowly metered in. The reaction temperature is kept at about 50° C. After complete addition of the dibutylamine, allow the reaction to continue until the theoretical NCO value for this stage (2.91% by weight) is reached.

Once the theoretical NCO value has been reached, 200.0 g (0.2000 mol) of MPEG 1000 (trade name: Polyglycol M 1000; from Clariant) are metered in. The reaction temperature is kept at about 60° C. After complete addition of the MPEG 1000, allow the reaction to continue until the NCO value has fallen to zero.

The reaction product is mixed with 2770.4 g of tap water with thorough stirring until a homogeneous yellowish almost clear solution (solids content 15% by weight) forms. The pH of 4.0-4.5 is then established with acetic acid (98%; from Aldrich).

Example 5

Initially introduce 605.9 g (2.1601 mol) of sunflower oil fatty acid (from Hanf & Nelles) into the reaction vessel at room temperature, and 393.1 g (1.0799 mol) of bisphenol A diglycidyl ether (trade name: Araldit GY 240; from Huntsman) and then add 1.0 g (0.0031 mol) of tetrabutylammonium bromide (from Aldrich). The reaction space is flushed with nitrogen and the reaction mixture is heated to 150° C. This temperature is maintained until an acid number of <2 is reached.

Duration of reaction: about 8 h.

Example 5A

Initially introduce 160.0 g (0.1730 mol) of the fatty acid adduct from example 5 into the reaction vessel at 50° C. and add 3 drops of T12-DBTL (catalyst; from Aldrich). Keep the initially introduced mixture in the reaction vessel at 50° C. and meter in ⅓ (15.1 g; 0.0865 mol) of the amount of toluene diisocyanate (TDI; from Aldrich) over about 40 min. The reaction temperature is kept at 50-60° C. After addition of the 1st amount of toluene diisocyanate, allow the reaction to continue until the NCO value has fallen to zero.

In a 2nd reaction vessel, a further third (15.1 g; 0.0865 mol) of the amount of toluene diisocyanate and 3 drops of T12-DBTL are initially introduced and kept at 40° C. 173.0 g (0.0865 mol) of MPEG 2000 (trade name: Polyglycol M 2000; from Clariant) are metered in over 60 min. After complete addition of the MPEG 2000, allow the reaction to continue until the theoretical NCO value for this stage (1.93% by weight) is reached.

In a 3rd reaction vessel, the last third (15.1 g; 0.0865 mol) of the amount of toluene diisocyanate and 3 drops of T12-DBTL are initially introduced and kept at 30° C. 19.1 g (0.0865 mol) of 3-aminopropyltriethoxysilane (trade name: Dynasylan AMEO; from Degussa) are then metered in over 60 min. After complete addition of the 3-aminopropyltriethoxysilane, allow the reaction to continue until the theoretical NCO value for this stage (10.62% by weight) is reached. The reaction products from reaction vessels 2 and 3 are now added to the reaction product in reaction vessel 1. The reaction is allowed to continue at 40° C. until the NCO value has fallen to zero.

The reaction product is mixed with 2251.9 g of tap water with thorough stirring until a homogeneous yellowish almost clear solution (solids content 15% by weight) forms.

Example 5B 26.7 g (0.1200 mol) of isophorone diisocyanate (IPDI; from Aldrich) are initially introduced into a 1st reaction vessel at room temperature, 2 drops of T12-DBTL (catalyst; from Aldrich) are added and the initially introduced mixture is heated to 60° C. 240.0 g (0.1200 mol) of MPEG 2000 (trade name: Polyglycol M 2000; from Clariant) are then metered in over about 60 min. The reaction temperature is kept at 60° C. until the theoretical NCO value for this stage (1.89% by weight) is reached.

Once the theoretical NCO value has been reached, 111.0 g (0.1200 mol) of the fatty acid adduct from example 5 are added. The reaction is allowed to continue at 60° C. until the NCO value has fallen to zero. 26.7 g (0.1200 mol) of isophorone diisocyanate (IPDI; from Aldrich) are initially introduced into a second reaction vessel at room temperature, 2 drops of T12-DBTL (catalyst; from Aldrich) are added and the initially introduced mixture is heated to 40° C. 26.5 g (0.1200 mol) of 3-aminopropyltriethoxysilane (trade name: Dynasylan AMEO; from Degussa) are metered in over about 60 min. The reaction temperature is kept at 40-50° C. until the theoretical NCO value for this stage (9.47% by weight) is reached.

Once the theoretical NCO value has been reached, 111.0 g (0.1200 mol) of the fatty acid adduct from example 5 are added. The reaction is allowed to continue at 40-50° C. until the NCO value has fallen to zero.

Thereafter, the reaction product from reaction vessel 2 is added to that in reaction vessel 1 and the mixture is kept at 60° C. 26.7 g (0.1200 mol) of isophorone diisocyanate are metered in over 15 min. The reaction is allowed to continue at 60° C. until the NCO value has fallen to zero.

The reaction product is mixed with 3222.1 g of tap water with thorough stirring until a homogeneous yellowish almost clear solution (solids content 15% by weight) forms. The pH of 4.0-4.5 is then established with acetic acid (98%; from Aldrich).

Testing of the Products Produced

The test specimens are produced by the following method and tested for their efflorescence behavior:

In accordance with the standard, a mixture (11 kg) is produced according to the following formulation in a positive mixer, all aggregates first being dry-mixed for 10 sec. Thereafter, the initial water is added and mixing is effected for 2 min, after which the remaining water is added (duration of mixing 2 min). The admixture is added to the remaining water:

| | |
|---|---|
| 380 kg/m$^3$ | Cement (Bernburg CEM I 42.5 R; 380 kg/m$^3$) |
| 1104 kg/m$^3$ | Sand 0/2 |
| 296 kg/m$^3$ | Gravel 2/5 |
| 296 kg/m$^3$ | Gravel 5/8 |
| 137 kg/m$^3$ | Water |
| w/c: | 0.36 |

The admixture is used in different doses, based on the cement in the mixture, and is added either to the remaining water or to the concrete mix. The data on the metering of the admixture are always based on solid "admixture" to solid "cement". The water content of the admixture is subtracted from the amount of mixing water.

For the production of the test specimens, in each case exactly 1300 g of the fresh concrete mix is introduced into round molds and compacted with an applied weight 30 kg on a vibrating table for 90 sec. Thereafter, the fresh test specimen is removed from the mold and stored for 2 days in a conditioned chamber (20° C., 65% relative humidity) for hardening. The lightness of the test specimens is then measured using a color photospectrometer (Color-Guide sphere spin, Byk Gardner) (L1), a template having 9 measuring points being placed on the test specimens so that the same points can be measured later on in the 2nd measurement. The mean value L1 is obtained from these 9 points. Thereafter, the blocks are immersed in distilled water for about 2 sec and packed air tight in a plastic bag while moist. This bag is stored in the conditioned chamber for 10 days. Thereafter, the blocks are unpacked and are stored in the conditioned chamber for 2 days for drying. The lightnesses of the test specimens are now measured a 2nd time using the template and color photospectrometer (L2). 6 test specimens are prepared per mix (and the mean value calculated therefrom). The color change of the surface (ΔL) of the test specimens (increase in whiteness) is: ΔL=L2−L1.

In addition to the lightening (ΔL) of the test specimens due to the efflorescence, the homogeneity of the surface was also assessed, and the water absorption of the test specimens was determined. The determination of the water absorption (WA) is effected on the basis of EN ISO 15148. The dry and hardened test specimens are weighed (W1) and placed in a water bath so that the under side rests on the point supports and does not touch the container bottom. The water level is about 5 mm above the highest point of the underside. After 15 min, the test specimens are removed from the water bath and weighed a 2nd time (W2). The test specimen is dried beforehand with a moist sponge which has been rung out. The water absorption is: WA=W2−W1.

TABLE 1

(Accelerated efflorescence in the condition chamber, 20° C., 65% relative humidity)

| Example | Dose [% by weight] | Lightness difference ΔL | Water absorption WA [g] | Assessment of the surface |
|---|---|---|---|---|
| 1 A | 0.25 | 0.8 (7.9) −90% | 3.5 (58.0) −94% | perfect |
|  | 0.10 | 0.9 (7.9) −89% | 4.0 (58.0) −93% | perfect |
| 1 B | 0.25 | 0.9 (7.9) −89% | 3.2 (58.0) −94% | perfect |
|  | 0.10 | 1.0 (7.9) −87% | 3.5 (58.0) −94% | perfect |
| 1 C | 0.25 | 0.7 (7.9) −91% | 2.9 (58.0) −95% | perfect |
|  | 0.10 | 0.8 (7.9) −90% | 3.3 (58.0) −94% | perfect |
| 2 A | 0.25 | 0.9 (9.0) −90% | 4.3 (52.7) −92% | perfect |
|  | 0.10 | 1.0 (9.0) −89% | 4.8 (52.7) −91% | perfect |
| 3 A | 0.25 | 0.8 (8.2) −90% | 3.9 (48.3) −92% | perfect |
|  | 0.10 | 0.9 (8.2) −89% | 5.0 (48.3) −90% | perfect |
| 4 A | 0.25 | 0.6 (8.7) −93% | 2.7 (51.1) −95% | perfect |
|  | 0.10 | 0.8 (8.7) −91% | 3.1 (51.1) −94% | perfect |
| 4 B | 0.25 | 0.7 (8.7) −92% | 2.5 (51.1) −95% | perfect |
|  | 0.10 | 0.9 (8.7) −90% | 3.0 (51.1) −94% | perfect |
| 5 A | 0.25 | 0.7 (7.8) −91% | 2.7 (54.7) −95% | perfect |
|  | 0.10 | 0.8 (7.8) −90% | 3.1 (54.7) −94% | perfect |
| 5 B | 0.25 | 0.6 (7.8) −92% | 2.4 (54.7) −96% | perfect |
|  | 0.10 | 0.7 (7.8) −91% | 2.8 (54.7) −95% | perfect |

The values in brackets are the results of the zero mixes (without admixture). The percentage values indicate the extent to which the admixture has reduced the lightness of the water absorption in each case in comparison with the zero mix (without admixture). The dosage indicates the solids content of the admixture, based on cement in the mixture.

The invention claimed is:

1. A hydraulically settable building material comprising an amphiphilic polymer compound prepared by the process of:
    a) reacting a di-, tri- or tetraglycidyl compound (A) with an optionally unsaturated reactive component (B) comprising $C_8$-$C_{28}$-fatty acid, a $C_8$-$C_{28}$-alcohol or a secondary $C_8$-$C_{28}$-amine, and
    $b_1$) allowing the reaction product from stage a) to react further first with
    $b_{1\alpha}$) an aliphatic or aromatic polyisocyanate compound (C)
    $b_{1\beta}$) and thereafter with a polyalkylene oxide compound (D) having the formula (I)

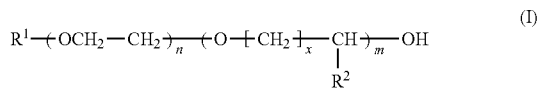

wherein
    $R^1$ is H, a linear or branched and optionally unsaturated aliphatic hydrocarbon radical having 1 to 12 C atoms,
    $R^2$ is a linear or branched and optionally unsaturated aliphatic hydrocarbon radical having 1 to 30 C atoms or phenyl;
    m is from 0 to 250;
    n is from 3 to 250; and
    x is from 1 to 12;
and the ethylene oxide or higher alkylene oxide units can be arbitrarily distributed in the polyalkylene oxide compound (D), and
    $b_{1\gamma}$) reacting the reaction product from stage $b_{1\beta}$) with a component (E) which is reactive with isocyanates and has at least one OH, $NH_2$, NH or SH group, or
    $b_2$) allowing the reaction product from stage a) to react to completion with the reaction product of component (C) with component (E) and optionally (D) and (C), or
    $b_3$) allowing the reaction product from stage a) to react to completion with the reaction product from component (C) and component (D) and optionally (C) and optionally the reaction product of component (C) and component (E) and optionally (C).

2. The hydraulically settable building material according to claim 1, wherein a glycidyl compound selected from the group consisting of cyclohexanedimethanol diglycidyl ether, glyceryl triglycidyl ether, neopentyl glycol diglycidyl ether, pentaerythrityl tetraglycidyl ether, 1,6-hexanediol diglycidyl ether, polypropylene glycol diglycidyl ether, polyethylene glycol diglycidyl ether, trimethylolpropane triglycidyl ether, bisphenol A diglycidyl ether, bisphenol F diglycidyl ether, 4,4'-methylenebis(N,N-diglycidylaniline), tetraphenylolethane glycidyl ether, N,N-diglycidylaniline, diethylene glycol diglycidyl ether and 1,4-butanediol diglycidyl ether, or mixtures thereof is used as component (A).

3. The hydraulically settable building material according to claim 1, wherein reactive component (B) is a fatty acid selected from the group consisting of tall oil fatty acid, stearic acid, palmitic acid, sunflower oil fatty acid, coconut oil fatty acid ($C_8$-$C_{18}$), coconut oil fatty acid ($C_{12}$-$C_{18}$), soybean oil fatty acid, linseed oil fatty acid, dodecanoic acid, oleic acid, linoleic acid, palm kernel oil fatty acid, palm oil fatty acid, linolenic acid and arachidonic acid.

4. The hydraulically settable building material according to claim 1, wherein reactive component (B) is an alkanol selected from the group consisting of 1-eicosanol, 1-octadecanol, 1-hexadecanol, 1-tetradecanol, 1-dodecanol, 1-decanol and 1-octanol.

5. The hydraulically settable building material according to claim 1, wherein component (B) is a dialkylamine selected from the group consisting of 2-ethylhexylamine, dipentylamine, dihexylamine, dioctylamine, bis(2-ethylhexyl)amine, N-methyloctadecylamine and didecylamine.

6. The hydraulically settable building material according to claim 1, wherein from 0.9 to 1.1 mol of the reactive component (B) are provided per mole of the glycidyl groups of component (A).

7. The hydraulically settable building material according to claim 1, wherein the aliphatic polyisocyanate is 1-isocyanato-5-isocyanatomethyl-3,3,5-trimethylcyclohexane (IPDI), bis (4-isocyanatocyclohexyl)methane (H12MDI), 1,3-bis(1-isocyanato-1-methylethyl)benzene (m-TMXDI), 1,6-diisocyanatohexane (HDI) or a mixture thereof.

8. The hydraulically settable building material according to claim 1, wherein the aromatic polyisocyanate is 2,4-diisocyanatotoluene (TDI), bis(4-isocyanatophenyl)methane (MDI), or a mixture thereof.

9. The hydraulically settable building material according to claim 1, wherein the polyisocyanate compound is used in an amount such that the NCO/OH equivalent ratio, based on the free OH group in the reaction product of glycidyl component (A) and reactive component (B) from stage a), is from 0.5 to 2.0.

10. The hydraulically settable building material according to claim 1, wherein, in formula (I) at least one of $R^1$ or $R^2$ is —$CH_3$, CH=$CH_2$— or $CH_2$=CH—$CH_2$—.

11. The hydraulically settable building material according to claim 1, wherein the polyalkylene oxide compound (D) is present in an amount of from 0.4 to 0.6 mol per mole of free isocyanate groups of the reaction product in stage b) or of the polyisocyanate compound (C).

12. The hydraulically settable building material according to claim 1, wherein component (E) is an aliphatic alcohol, primary amine, secondary amine or a thiol having 1 to 12 C atoms or an aromatic alcohol, primary amine, secondary amine or a thiol having 6 to 10 C atoms.

13. The hydraulically settable building material according to claim 1, wherein component (E) is an amino- or mercaptosilane selected from the group consisting of 3-aminopropyltriethoxysilane, 3-aminopropyltrimethoxysilane, 2-aminoethyl-3-aminopropyltrimethoxysilane, bis(3-triethoxysilylpropyl)amine, bis(3-trimethoxysilylpropyl)amine, N-(n-butyl)-3-aminopropyltrimethoxysilane, N-(2-aminoethyl)-3-aminopropylmethyldimethoxysilane, 3-aminopropylmethyldiethoxysilane, 3-aminopropylmethyldiethoxysilane, 3-mercaptopropyltrimethoxysilane and 3-mercaptopropyltriethoxysilane.

14. The hydraulically settable building material according to claim 1, wherein the component (E) is present in an amount of from 0.4 to 0.6 mol per mole of free isocyanate groups of the reaction products in stage $b_{1\alpha}$) or $b_{1\beta}$).

15. The hydraulically settable building material according to claim 1, wherein the polymer is prepared by a process comprising the steps of:
    a) reacting a di-, tri- or tetraglycidyl component (A) with an optionally unsaturated reactive component (B) comprising $C_8$-$C_{28}$-fatty acid, a $C_8$-$C_{28}$-alcohol or a secondary $C_8$-$C_{28}$-amine at a temperature of from 20 to 250° C., optionally in the presence of an acidic or basic catalyst to form a reaction product, and b₁) reacting the reaction product from stage a) with b₁α) first a polyisocyanate component (C) without a solvent in the temperature range from 20 to 120° C., b₁β) and thereafter with a polyalkylene oxide compound (D) at a temperature of from 20 to 150° C., wherein said polyalkylene oxide compound (D) is of formula (I)

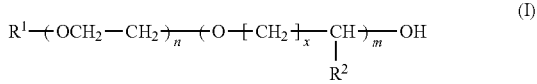

wherein $R^1$ is H, a linear or branched and optionally unsaturated aliphatic hydrocarbon radical having 1 to 12 C atoms, $R^2$ is a linear or branched and optionally unsaturated aliphatic hydrocarbon radical having 1 to 30 C atoms or phenyl;

m is from 0 to 250;

n is from 3 to 250; and x is from 1 to 12;

and the ethylene oxide or higher alkylene oxide units can be arbitrarily distributed in the polyalkylene oxide compound (D) and b₁γ) reacting the reaction product from stage b₁β) with a component (E) at a temperature of from 20 to 150° C., wherein the component (E) is reactive with isocyanates and has at least one OH, $NH_2$, NH or SH group; or b₂) reacting the reaction product from stage a) to completion with the reaction product of component (C) with component (E) and optionally (D) and (C), or b₃) reacting the reaction product from stage a) to completion with the reaction product of component (C) and (D) and optionally (C) and optionally the reaction product of component (C) and component (E) and optionally (C) to form the polymer compound.

16. The hydraulically settable building material as claimed in claim 15, wherein a) the glycidyl component (A) is reacted with the reactive component (B), and thereafter b₁α) the reaction product from stage a) is reacted further with the polyisocyanate component (C), then b₁β) the reaction product from stage b₁α) is reacted with the polyalkylene oxide compound (D) without a solvent at temperatures of from 20 to 150° C., and finally b₁γ) the reaction product from stage b₁β) is reacted to completion with the component (E) without a solvent at temperatures of from 20 to 150° C.

17. The hydraulically settable building material as claimed in claim 15, wherein a) the glycidyl component (A) is reacted with the reactive component (B), and then b₁α) the reaction product from stage a) is allowed to react further with the polyisocyanate component (C), and b₁β) the reaction product from stage b₁α) is allowed to react to completion either in succession or simultaneously with the compound (D) and the component (E).

18. The hydraulically settable building material as claimed in claim 15, wherein a) the glycidyl component (A) is reacted with the reactive component (B) and then b₂) the reaction product from stage a) is allowed to react to completion with the reaction product of component (C), with component (E) and optionally components (D) and (C).

19. The hydraulically settable building material as claimed in claim 16, wherein a) the glycidyl component (A) is reacted with the reactive component (B) and then b₃) the reaction product from stage a) is allowed to react to completion with the reaction product of component (C) and component (D) and optionally (C) and optionally the reaction product of component (C) and component (E) and optionally (C).

20. The hydraulically settable building material of claim 1, wherein the polymer compound is present in an amount sufficient to suppress efflorescence on a surface of the hydraulically settable building material when the material is hardened.

21. The hydraulically settable building material of claim 1, which is unhardened.

22. The hydraulically settable building material of claim 1, wherein the polymer compound is present in the unhardened, hydraulically settable building material in an amount of from 0.001 to 5% by weight, based on the proportion of binder in the material.

* * * * *